J. E. SMITH.
GATE.
APPLICATION FILED SEPT. 25, 1908.
933,677.
Patented Sept. 7, 1909.
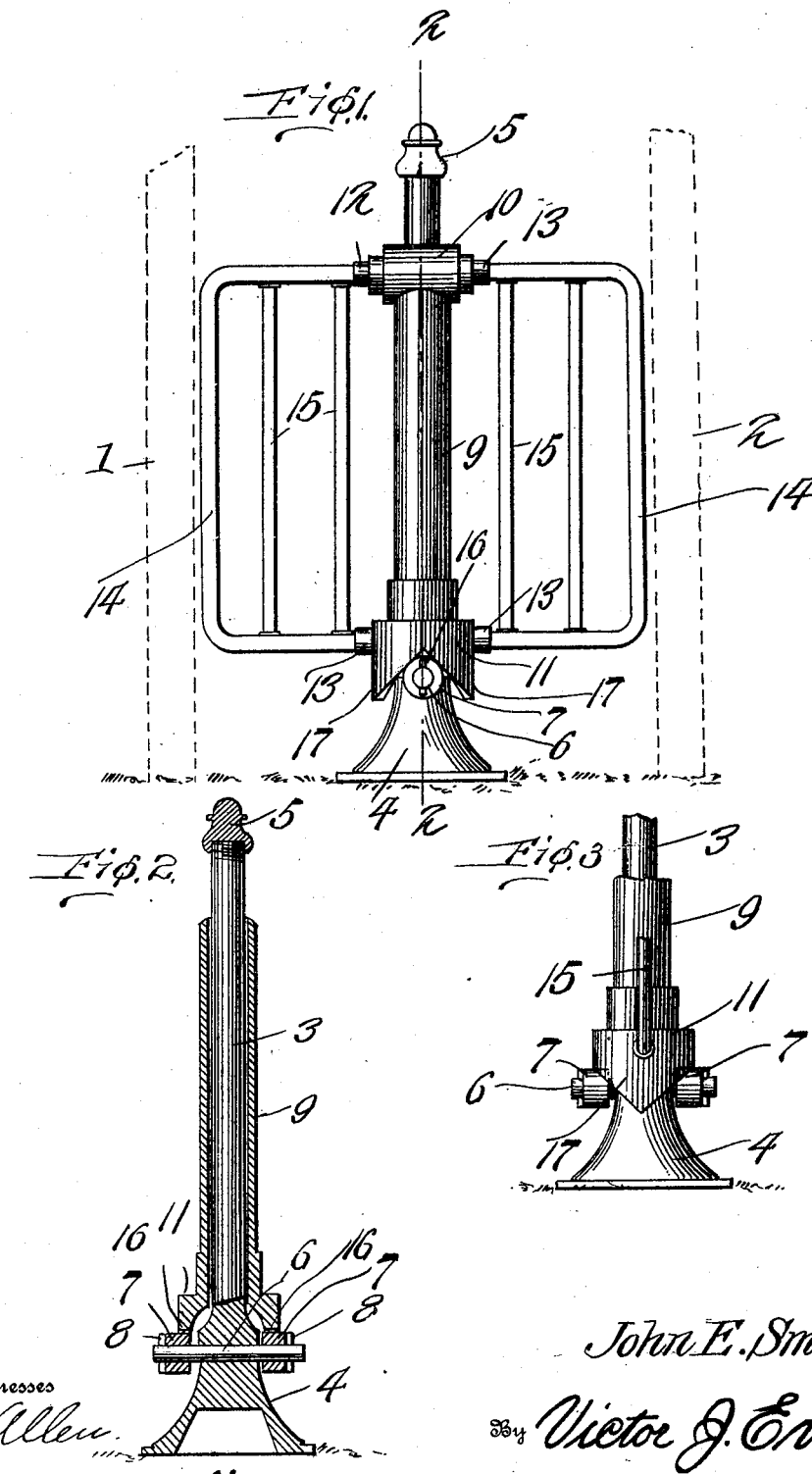
Witnesses
F. Allen
C. C. Hines
Inventor
John E. Smith.
By Victor J. Evans
Attorney

UNITED STATES PATENT OFFICE.

JOHN E. SMITH, OF KANSAS CITY, KANSAS.

GATE.

933,677.

Specification of Letters Patent.   Patented Sept. 7, 1909.

Application filed September 25, 1908.   Serial No. 454,710.

*To all whom it may concern:*

Be it known that I, JOHN E. SMITH, a citizen of the United States, residing at Kansas City, in the county of Wyandotte and State of Kansas, have invented new and useful Improvements in Gates, of which the following is a specification.

This invention relates to gates, the object of the invention being to provide a gate which is pivotally mounted to swing in either direction and is adapted on its opening movement to be elevated and automatically returned when released to closed position.

A further object of the invention is to provide a gate in which the elevating and closing means will form a lock to automatically secure the gate in closed position, the construction and arrangement of the elevating and locking mechanism being such as to adapt the same to be used upon an end pivoted or centrally pivoted gate and to be housed and protected in use from the elements.

The invention consists of the features of construction, combination and arrangement of parts hereinafter fully described and claimed, reference being had to the accompanying drawing, in which:—

Figure 1 is a view in elevation of the gate, showing the same in closed position. Fig. 2 is a vertical transverse section through the pivot post and sleeve thereof on line 2—2 of Fig. 1. Fig. 3 is an elevational view of the lower portion of the post and sleeve taken at right angles to Fig. 1.

Referring to the drawing, the numerals 1 and 2 represent posts arranged at the opposite side of the gateway, said posts being indicated in dotted lines. Centrally arranged between these posts is a pivot post 3 provided at its lower end with an enlarged or expanded base 4, which may be embedded or anchored in any secure manner in the ground or fastened to any preferred type of foundation, and provided at its upper end with any preferred type of crown cap or ornament 5.

Extending through the upper portion of the base of the post 3 parallel with and in the central line of the gateway is a bearing rod or pin 6, the ends of which extend beyond the posts and carry rollers 7 fastened from outward displacement by cotter pins or keys 8. Mounted to turn upon the post is a sleeve 9 provided at its upper end with a collar 10 and at its lower end with a collar 11. These collars are provided at diametrically opposite sides with laterally projecting sockets 12 and 13 which receive the free ends of oppositely arranged U-shaped frame bars 14, which ends of the bars are suitably secured in said sockets. These bars form the main side frames of the body of the gate, which is completed by the central pivot sleeve 9 and spaced vertical panel rods 15 extending between the upper and lower horizontal arms of each U-shaped frame bar. The gate as thus constructed and mounted is adapted to swing in either direction upon the central pivot post and in effect constitutes a rotary turnstile which may be opened and closed in half revolution in either direction. The frame of the gate when in open position extends parallel with the gateway, thus providing passages on opposite sides of the pivot post and between the same and the posts 1 and 2. This construction allows the gate to be pushed open by a passerby in the direction of travel of the latter, with obvious convenience and a saving of time to such passerby in passing through the gateway.

The sleeve 11 is in the nature of a gate elevating and locking cam, being provided at diametrically opposite sides with V-shaped recesses 16 and at right angles to said recesses with intervening depending V-shaped flanges 17. The lower edge of the sleeve rests and travels upon the rollers 7, and the parts described are so arranged that when the gate is in closed position the rollers lie in the highest points of the V-shaped recesses, as shown, thus locking the gate from opening movement except by a forcible pushing pressure upon one or the other of the gate frame portions 14. In the closed position of the gate, therefore, the flanges 17 lie at right angles to the axes of the rollers and facing the posts 1 and 2. When the gate is opened in either direction, the cam flanges 17 travel up on the rollers until the points of said flanges come in contact with the highest surfaces of the rollers, by which operation the gate will be elevated. When the gate is released by the passerby, the points of the cam flanges, being too small in area to rest squarely on the rollers, will slide in one direction or the other beyond center and the gate will automatically return to closed position by gravity, the acting cam flanges running downward on the rollers until the latter are again seated in the V-shaped recesses 16, as will be readily understood. The gate will then be locked in closed position against wind pressure or any other ordinary pressure until it is again manually opened.

It will be seen from the foregoing description that a gate is provided which is adapted to swing freely in either direction to an open position, to be automatically locked in closed position, and to automatically close by gravity. It will also be seen that by the construction of the pivot posts, the arrangement of the rollers 7 and the form and arrangement of the parts of the cam sleeve 11, that said sleeve serves as a housing to prevent the accumulation of snow or other foreign substances between the same and the pivot posts and protects the rollers sufficiently to prevent ice or snow from coating the same or adhering in sufficient quantity to clog and interfere with the operation of the parts. It will be further seen that the construction of the pivot mounting adapts it to be employed equally well as a pivot support, lock and automatic closer for end pivoted or centrally pivoted gates, a manifest advantage.

Having thus fully described the invention, what is claimed as new is:—

In a gate, the combination of a pivot post having a base portion, a pin extending through the base portion at right angles to the position of the gate when closed, rollers removably mounted upon the projecting ends of the pin, said pivot post having an exteriorly threaded end portion, a sleeve revolubly mounted on the post and having at its upper end a transverse collar and at its lower end a depending collar inclosing the upper portion of the base of the post, said depending collar being provided at diametrically opposite sides with V-shaped recesses and at right angles to said recesses with intervening depending V-shaped flanges, the lower edge of the said sleeve resting upon and adapted to travel upon the said rollers, said recesses and flanges being respectively arranged to engage the rollers when the sleeve is turned to gate opening and gate closing positions, oppositely arranged socket members upon the collars, U-shaped gate frame sections having their ends engaged in said sockets, and an interiorly threaded cap engaged with the exteriorly threaded portion of the said pivot post.

In testimony whereof I affix my signature in presence of two witnesses.

JOHN E. SMITH.

Witnesses:
 GEORGE McDONALD,
 FRANK W. McGRATH.